United States Patent [19]
Miller et al.

[11] Patent Number: 5,626,391
[45] Date of Patent: May 6, 1997

[54] UPTILTABLE REAR VEHICLE SEAT ASSEMBLY

[75] Inventors: Michael P. Miller, New Hudson; Wojciech Smuk, Troy; Herbert A. Richter, Waterford, all of Mich.

[73] Assignee: Bertrand Faure Ltd., Mississauga, Canada

[21] Appl. No.: 450,797

[22] Filed: May 25, 1995

[51] Int. Cl.$^6$ .................................................. B60N 2/08
[52] U.S. Cl. .................... 297/331; 297/378.1; 296/65.1
[58] Field of Search ........................... 296/65.1; 297/14, 297/334, 331, 379

[56] References Cited

U.S. PATENT DOCUMENTS

| | | | |
|---|---|---|---|
| 4,318,569 | 3/1982 | Bilenchi et al. | 297/379 |
| 4,484,776 | 11/1984 | Gokimoto et al. | 297/379 X |
| 4,700,989 | 10/1987 | Ercilla | 297/331 |
| 5,498,051 | 3/1996 | Sponsler et al. | 296/65.1 |

*Primary Examiner*—Joseph D. Pape
*Attorney, Agent, or Firm*—Patrick J. Hofbauer

[57] ABSTRACT

A rear vehicle seat assembly comprises a seat cushion member supported by a support sub-assembly having downwardly extending front and rear seat legs. Each front seat leg includes a forked leg member co-operable with an attachment rod on a vehicle floor. Each rear seat leg includes a forked leg portion co-operable with a attachment rod on the vehicle floor. A first moveable lock member mounted on each of the rear seat legs permits selective locking of the respective one of the rear seat legs on the corresponding attachment rod. A biasing spring urges each lock member to a locked position. A manually operable handle is mounted on each of said rear seat legs to provide for selective manipulation of each lock member into an unlocked position, in order to release the rear seat legs with respect to the corresponding attachment rod, thereby to allow the vehicle seat assembly to be pivotal about the attachment rods associated with the front seat legs, between a lowered position and an uptilted position. A control rod system pivotally connected to the vehicle seat assembly is selectively moveable between a stowed position whereat the control rod system is retracted adjacent the underside of the seat cushion member, and a deployed support position whereat the control rod system is situated in stable, interposed relation between the underside of the seat cushion member and the vehicle floor when the vehicle seat assembly is in the uptilted position, so as to support the seat assembly in the uptilted position.

25 Claims, 15 Drawing Sheets

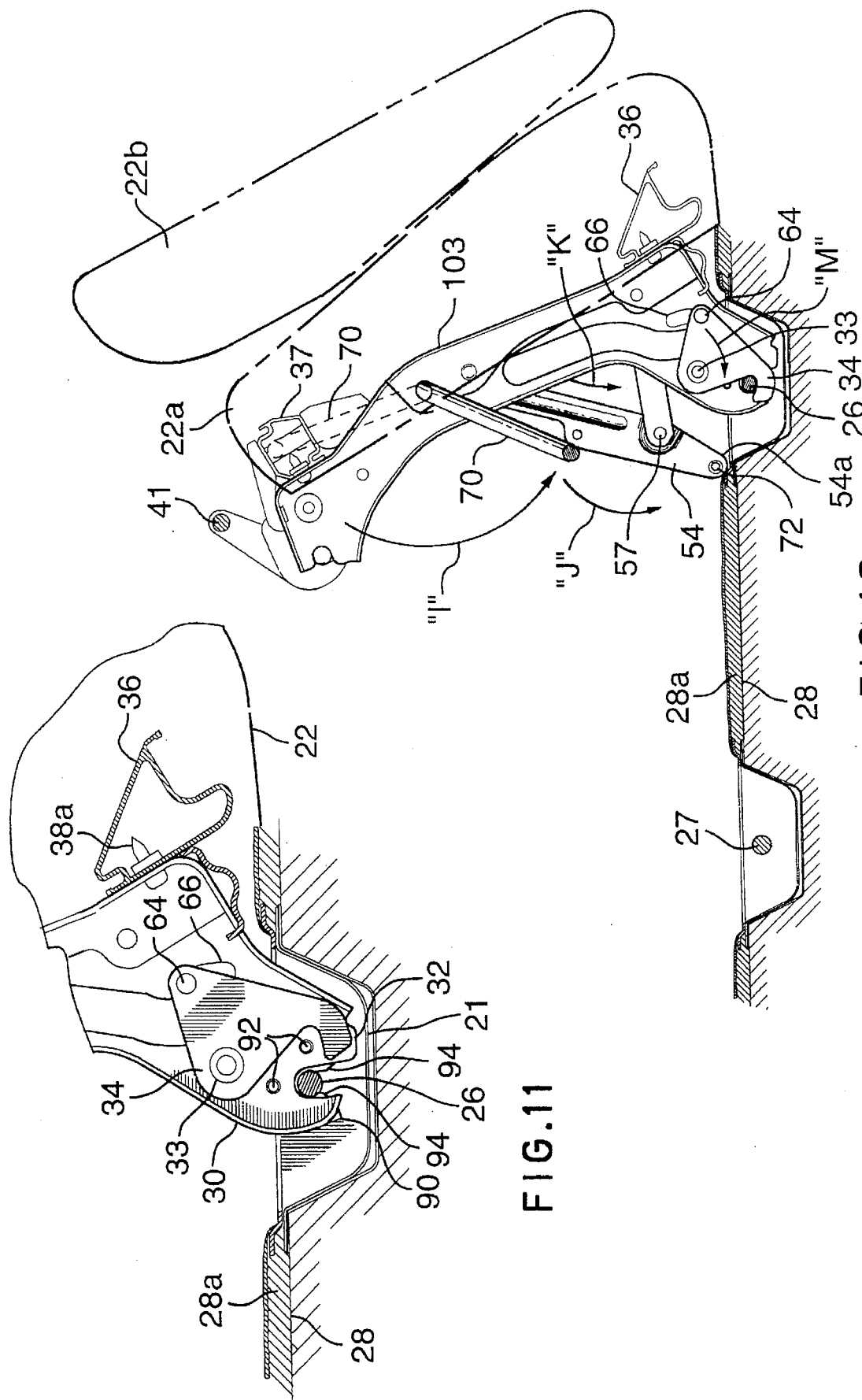

UPTILTABLE REAR VEHICLE SEAT ASSEMBLY

FIELD OF THE INVENTION

This invention relates to vehicle seat assemblies for use in multi-seat vehicles, such as mini-vans and the like, and more particularly, to such vehicle seat assemblies wherein the vehicle seat assembly is pivotally movable between a lowered position and an uptilted position, and is also removable from the vehicle.

BACKGROUND OF THE INVENTION

Combination passenger and utility type vehicles, such as mini-vans, sport-utility vehicles, and the like, are commonly constructed such that one or more of the vehicle seat assemblies positioned behind the driver's seat are moveable or removable in some manner in order to provide a larger cargo area behind the driver's seat. Such rearwardly positioned seat assemblies will hereinafter be referred to in this specification and claims as a "rear vehicle seat assembly" as the context requires.

As complete removal of rear vehicle seat assemblies to increase cargo space requires considerable effort and a space to store the rear seat assembly, when removed, and as such complete removal from the vehicle is not always practical or necessary, some rear seat assemblies for minivans and sport-utility vehicles are pivotally moveable between a lowered position, which lowered position is an in-use position, and an uptilted position, which uptilted position is a stowed position. However, for safety reasons, the vehicle seat assembly must first be unlocked at its rear legs in order to be moved from its lowered position to its uptilted position.

One such rear vehicle seat assembly is disclosed in U.S. Pat. No. 4,700,989 (Ercilla), wherein a vehicle seat assembly is pivotally movable between a lowered position and an uptilted position. In the lowered position, the legs of the vehicle seat assembly are locked to fixed attachment rods supported by the vehicle floor. The front legs of Ercilla include a blocking mechanism that precludes unlocking of the locking means when the vehicle seat assembly is in its lowered position. In order to pivot the vehicle seat assembly from its lowered position to its uptilted position, for stowing it away, the locking means at the rear seat legs is first released, and the vehicle seat assembly is then pivoted forwardly to its uptilted position. In the uptilted position, the locking means at the front seat legs remains engaged, and must be separately released by way of additional manipulation of the locking means, if it is desired to entirely remove the vehicle seat assembly from the vehicle. Release of the locking means on the front seat legs by way of such additional manipulation is awkward and inconvenient to the user, as the locking means associated with the front seat legs is difficult to reach. Moreover, in order to release the locking means of Ercilla, it is necessary to grasp a connecting rod located immediately above the locking means near the vehicle floor. This is undesirable, since the person performing this locking manoeuver would typically be crouching within the vehicle, holding the rear vehicle seat assembly in its uptilted position with one hand, while trying to unlock the locking means on the front seat legs, with his/her other free hand, which adds to the awkwardness of the task.

Additionally, after the rear vehicle seat assembly has been moved to its uptilted position to increase storage space within the vehicle, it is necessary to support the vehicle seat assembly in that uptilted position, so that the rear vehicle seat assembly will not unexpectedly return to its lowered position during movement of the vehicle. In the Ercilla patent, there is no means disclosed for supporting the vehicle seat assembly in its uptilted position, although the production version of this device uses a strap connected between the seat cushion frame and the vehicle roof for this purpose. This is not only awkward to employ and aesthetically unpleasing in modern vehicles, but may pose a safety problem in crash-like situations, where the loading on such a strap can be unusually high. Moreover, such an arrangement permits some degree of pivotal movement of the uptilted seat in at least one pivotal direction, which movement results in unacceptable squeaks, rattles and other noise during travel of the vehicle over rough surfaces. Thus, it is desirable to rigidly secure the rear vehicle seat assembly in its uptilted position in a manner which prevents any significant amount of motion of the rear vehicle seat assembly in this position. Moreover, it is desirable that such rigid, secured support of the rear vehicle seat assembly be obtainable in an easy and convenient manner by the user.

It is, therefore, one object of the present invention to provide a rear vehicle seat assembly which is pivotally moveable from a lowered position to an uptilted position, and wherein the locking mechanism is convenient to reach and use.

It is another object of the present invention to provide a rear vehicle seat assembly which is pivotally moveable from a lowered position to an uptilted position, wherein the uptilted rear vehicle seat assembly is rigidly supported in its uptilted configuration against pivotal movement upon movement of a vehicle in which it is installed.

It is a further object of the present invention to provide a rear vehicle seat assembly which is pivotally moveable from a lowered position to an uptilted position, and wherein the aforesaid rigid support for the rear vehicle seat assembly is deployable in an easy and convenient manner.

SUMMARY OF THE INVENTION

In accordance with the present invention there is disclosed a rear vehicle seat assembly comprising a seat cushion member having an underside, and a support sub-assembly supporting said seat cushion member and comprising two or more downwardly extending front seat legs and two or more downwardly extending rear seat legs, each of the front seat legs including a forked leg member co-operable with a fixed attachment rod supported by a vehicle floor and each of the rear seat legs including a fork member co-operable with a fixed attachment rod supported by the vehicle floor. A first moveable lock member is mounted on each of the rear seat legs for selectively locking the respective of the rear seat legs on the corresponding attachment rod. A return biasing means is operatively connected to each first lock member for urging the first lock member into a locked position on the corresponding attachment rod. A first manually operable means is mounted on each of said rear seat legs to provide for selective manipulation of each first moveable lock member to an unlocked position against the return biasing means so as to release the rear seat legs with respect to the corresponding attachment rod, thereby allowing the vehicle seat assembly to be pivotally moveable about the corresponding attachment rod associated with each of the front seat legs between a lowered position and an uptilted position. A first control rod system is pivotally connected to the support sub-assembly and selectively moveable between a stowed position whereat the first control rod system is retracted adjacent the underside of the seat cushion member, and a deployed support position, whereat the first control rod system is situated in interposed stable relation between the underside of the seat cushion member and the vehicle floor, when the support sub-assembly is in the uptilted position, so as to support the support sub-assembly in the uptilted position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

FIG. 11 is an enlarged fragmentary sectional view of the front seat leg area of FIG. 10, taken from the opposite side of FIG. 10, along section line 11—11 of FIG. 4, wherein the first moveable lock member is in an unlocked position;

FIG. 12 is a cross-sectional full side elevational view similar to FIG. 11, wherein the first moveable lock member is in a locked position;

DETAILED DESCRIPTION OF A PREFERRED EMBODIMENT

Figure 1:
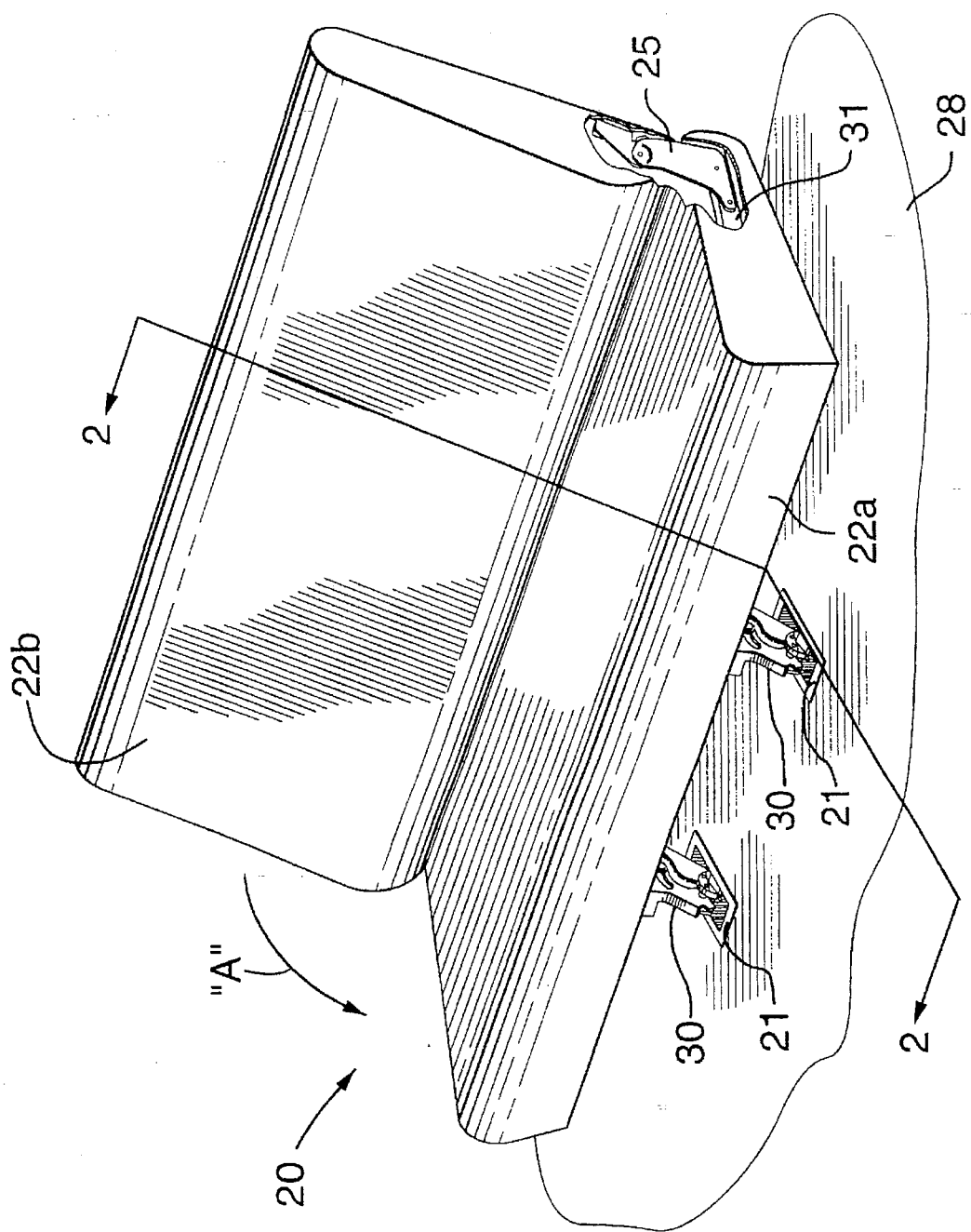
FIG. 1 is a perspective view, partially cut-away, of a preferred embodiment of rear vehicle seat assembly according to the present invention attached to the floor of a vehicle, with the seat cushion member and the seat back of the assembly shown in their in-use positions.
Figure 2:
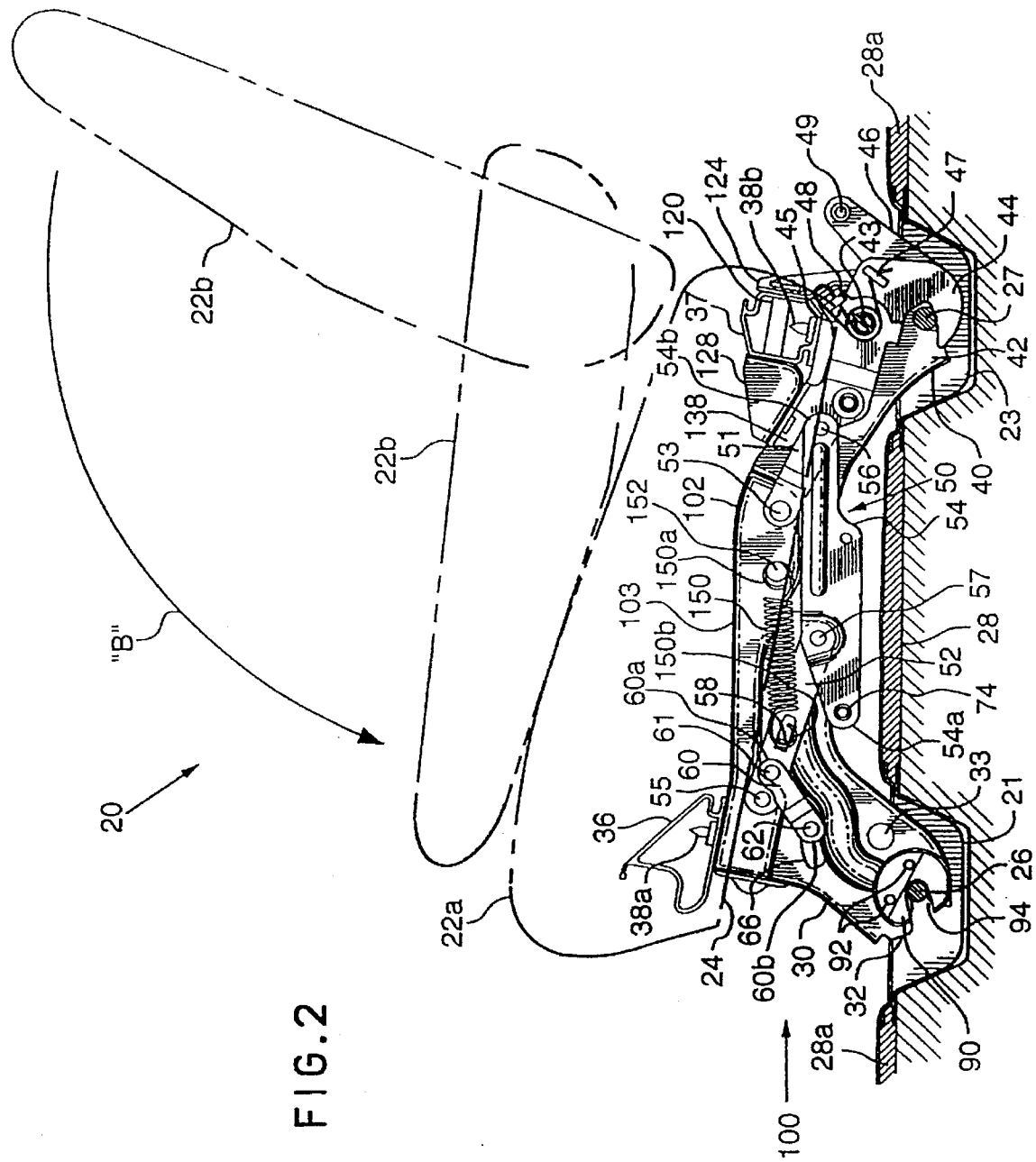
FIG. 2 is a cross-sectional, side elevational view along section line 2—2 of FIG. 1, with the seat cushion member and seat back of the assembly shown in ghost outline.
Figure 10:
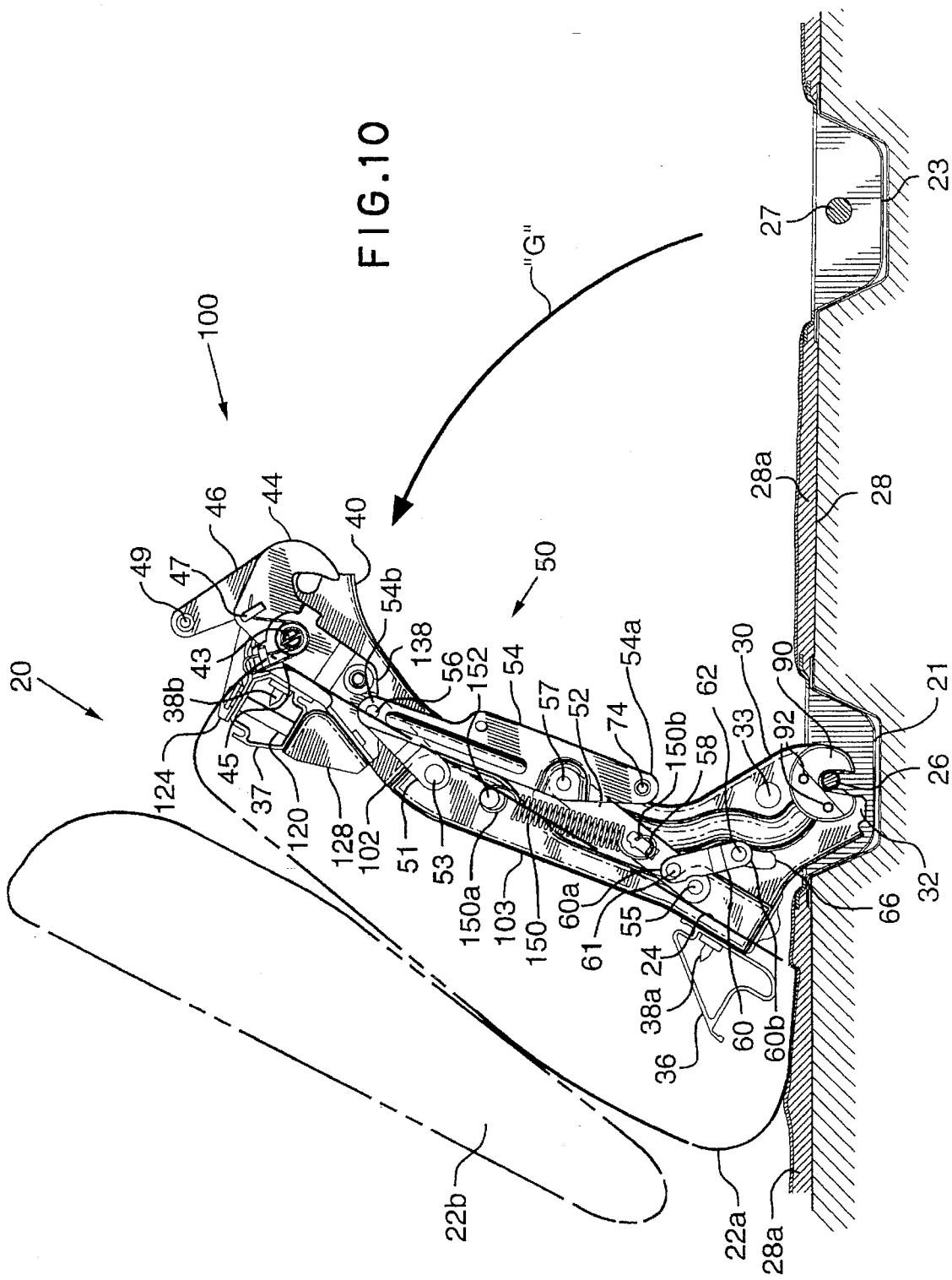
FIG. 10 is a view similar to FIG. 2, wherein the rear vehicle seat assembly has been pivoted to an uptilted position.

Referring now specifically to FIGS. 1 and 2 of the drawings, a preferred embodiment of the rear vehicle seat assembly according to the present invention, as designated by the general reference numeral 20, is shown installed on a vehicle floor 28 of a vehicle (not shown). The vehicle floor 28 is covered by a conventional carpeting material 28a, and has a pair of front floor wells 21,21 and a pair of rear floor wells 23,23. Each front floor well 21 has a fixed attachment rod 26 rigidly positioned therewithin in a conventional manner, so as to be supported by the vehicle floor 28. Similarly, each rear floor well 23 has a fixed attachment rod 27 rigidly positioned therewithin in a conventional manner, so as to be supported by the vehicle floor 28. The front 21 and rear 23 floor wells and the respective fixed attachment rods 26,27 are shaped and dimensioned to receive the rear vehicle seat assembly 20, as will be described in greater detail subsequently. The rear vehicle seat assembly 20 is pivotally movable about the front attachment rods 26,26 between its lowered in-use position, as is best seen in FIGS. 1 through 5, whereat the rear vehicle seat assembly 20 is configured for supporting an occupant, and an uptilted position, as is best seen in FIG. 10, whereat the rear vehicle seat assembly 20 is stowed within the vehicle.

Figure 5:
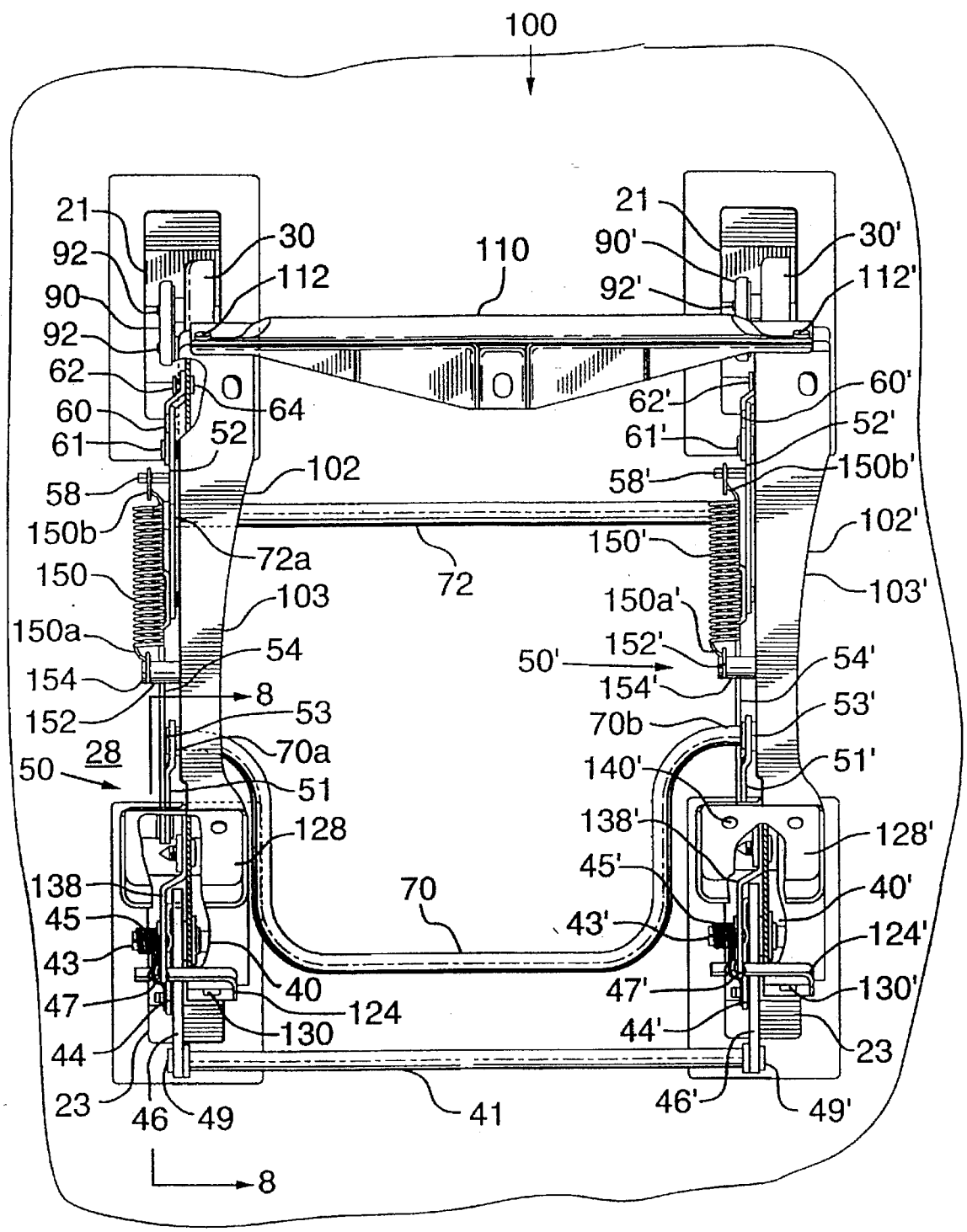
FIG. 5 is an enlarged top plan view of the rear vehicle seat assembly of FIG. 1, with the seat cushion member and the seat back of the assembly omitted for the sake of clarity.
Figure 6:
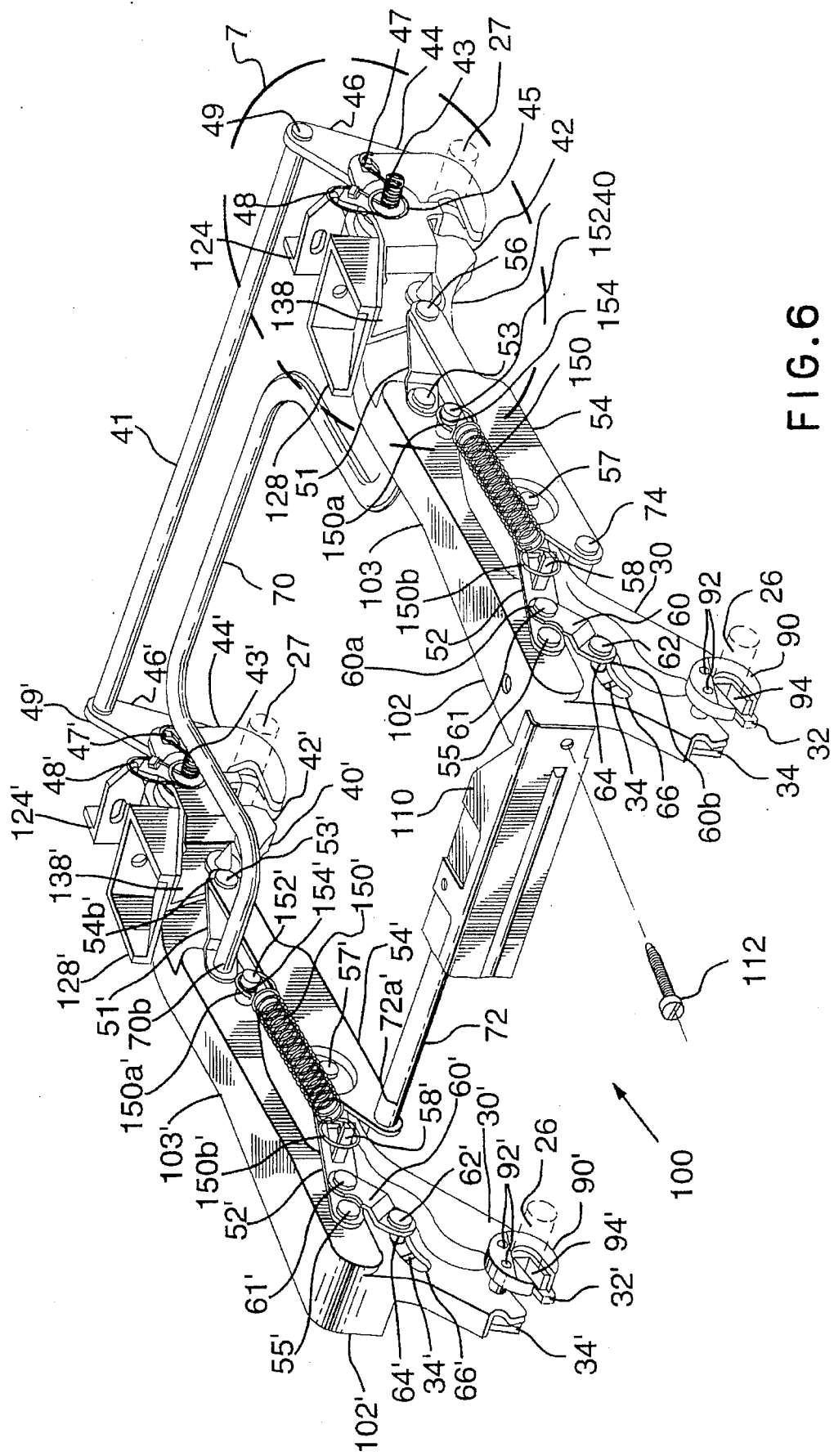
FIG. 6 is a perspective view from the front left of the rear vehicle seat assembly of FIG. 1, with the seat cushion member and seat back of the assembly omitted for clarity.

As can best be seen in FIG. 1, the rear vehicle seat assembly 20 of the preferred embodiment is a foldable bench-type seat, as is typically situated behind the driver's and front passenger's seats in mini-vans, sport-utility vehicles, and the like. In the preferred embodiment shown, the rear vehicle seat assembly 20 comprises a seat cushion member 22a having an underside 24, and also comprises a seat back 22b pivotally connected to the seat cushion member 22a by means of conventional seat hinges 25 disposed one hinge at each extreme side of the seat cushion member 22a, as best seen in FIGS. 1 and 5. The seat back 22b is pivotally foldable in a conventional manner over the seat cushion member 22a, as indicated by arrow "A" in FIG. 1 and by arrow "B" in FIG. 2, in which latter Figure both the upright and forwardly folded configurations of the seat back 22b are shown in phantom outline. In the forwardly folded configuration, the seat back 22b takes up less fore-aft room within the vehicle when the rear vehicle seat assembly 20 is moved into its stowed position, as will become more apparent as this description proceeds.

Figure 4:
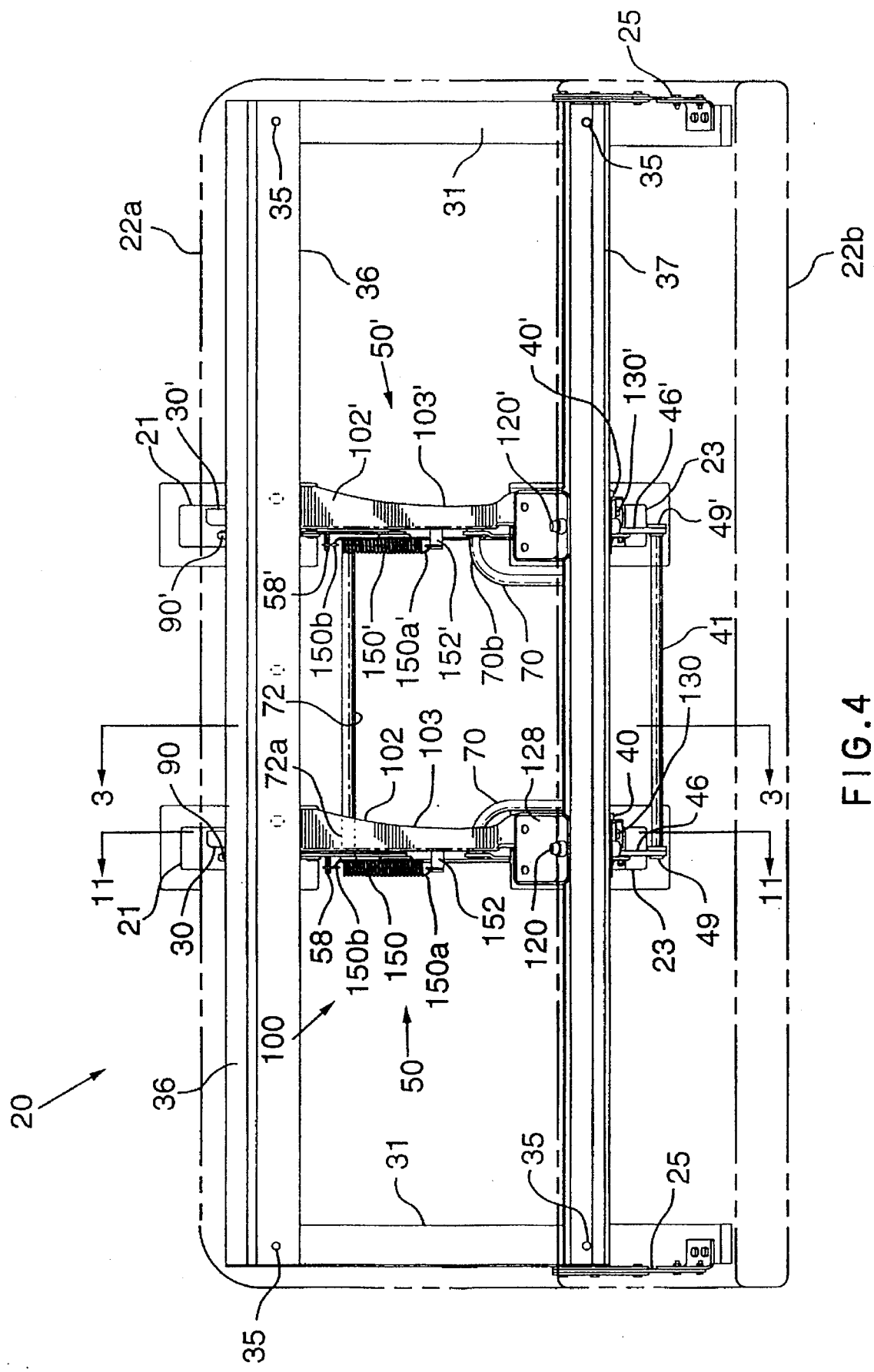
FIG. 4 is a top plan view of the rear vehicle seat assembly of FIG. 1, with the seat cushion member and the seat back of the assembly shown in ghost outline.

The seat cushion member 22a includes a front frame rail 36, a rear frame rail 37 and a pair of adjoining cross-rails 31, all secured together by rivets 35 or other conventional fastening means so as to form a rigid frame within the seat cushion member 22a (see FIG. 4). The front frame rail 36 and the rear frame rail 37 span substantially the entire lateral width of the seat cushion 22a, so as to provide rigid support therefor.

The seat cushion member 22a is supported in spaced relation above the vehicle floor 28 by a support sub-assembly, depicted by the general reference numeral 100, (see FIG. 5). The support sub-assembly 100 comprises a pair of generally parallel downwardly extending front seat legs 30,30' and a pair of generally parallel downwardly extending rear seat legs 40,40'. The front seat leg 30 and the rear seat leg 40 are disposed toward the left side of the rear vehicle seat assembly 20, as seen in FIGS. 4 and 5, while the front seat leg 30' and the rear seat leg 40' are disposed toward the right side of the rear vehicle seat assembly 20, as shown in these Figures.

For the sake of brevity, the support sub-assembly 100 will be described wherever possible in detail hereinafter with reference to the front seat leg 30 and the rear seat leg 40 and the operating components mounted thereon, only. It will, however, be readily understood by those skilled in the art that this description also applies to the front seat leg 30' and the rear seat leg 40', and analogous components mounted thereon, which analogous components will be designated in the Figures using like reference numerals distinguished by an apostrophe after the respective numeral.

When the rear vehicle seat assembly 20 is locked in place in its lowered position, the front seat legs 30,30' and the rear seat legs 40,40' securely connect the rear vehicle seat assembly 20 to the front 26,26 and rear 27,27 attachment rods, respectively (see FIGS. 1 through 6). When the rear vehicle seat assembly 20 is in its uptilted position, the front seat legs 30,30' securely connect the rear vehicle seat assembly 20 to the front attachment rods 26,26 (see FIGS. 10 through 14), about which front rods 26,26 the rear vehicle seat assembly 20 has been pivoted, as described more fully below.

A stamped component 102 of the support sub-assembly 100 is comprised of the front seat leg 30 and the rear seat leg 40 joined together by a central portion 103. The two substantially identical stamped components 102,102' are connected together one to the other by means of a cross beam 110 secured thereto by conventional threaded fasteners 112, or the like. Thus, the support sub-assembly 100 is essentially comprised of the two stamped components 102, 102', the operating components mounted thereon, and the connecting bracket 110. All of the operating components mounted on the stamped component 102 are present in duplicate form on the stamped component 102'.

The seat cushion member 22a and the support sub-assembly 100 are secured one to the other at the cross beam 110 and front frame rail 36 by threaded fasteners 38a (see FIGS. 2,3 and 4) and adjacent the rear seat legs 40,40' and rear frame rail 37 by threaded fasteners 38b. The seat cushion member 22a is further secured to the support sub-assembly 100 adjacent its rear edge by conventional bolts 120 engaging a first attachment bracket 124 and a second attachment bracket 128 (see FIG. 2), which brackets 120,124 are conventionally attached by, for example, welding to the stamped components 102,102'.

Each of the front seat legs 30 includes a mounting member in the form of a forked leg portion 32 co-operable with the corresponding fixed attachment rod 26. The forked leg portion 32 is shaped and dimensioned to allow the rear vehicle seat assembly 20 to pivot around the corresponding fixed attachment rod 26 and to be removable from and replaceable in the vehicle. A second moveable lock member 34, for releasably locking the front seat leg 30 on the corresponding attachment rod 26, is pivotally mounted one on each of the front seat legs 30, at the forked leg portion 32, by means of a staked pin 33 (see FIGS. 3, 11 and 12).

An anti-rattle member 90 is also mounted on the front seat leg 30, by mean of rivets 92, in co-operation with the forked leg portion 32. The anti-rattle member 90 has an oversized synthetic rubber insert 94 shaped and dimensioned to interface with the fixed attachment rod 26, so as to take up operative clearance of the forked leg portion 32 therewith, and to preclude relative movement of the forked leg portion 32 with respect to the fixed attachment rod 26, which relative movement would otherwise cause a rattle during movement of the vehicle.

Each of the rear seat legs 40 includes a forked leg portion 42 co-operable with a fixed attachment rod 27, thereby supporting the rear vehicle seat assembly 20 on the vehicle floor 28. A first moveable lock member 44, for releasably locking the rear seat leg 40 on the corresponding attachment rod 27, is pivotally mounted on the rear seat leg 40 through aperture 143 by means of an elongate pin 43, for pivotal movement about a first pivot axis "F" (shown in FIG. 6), as can be seen in FIGS. 3,6,7,8 and 9.

Figure 7:
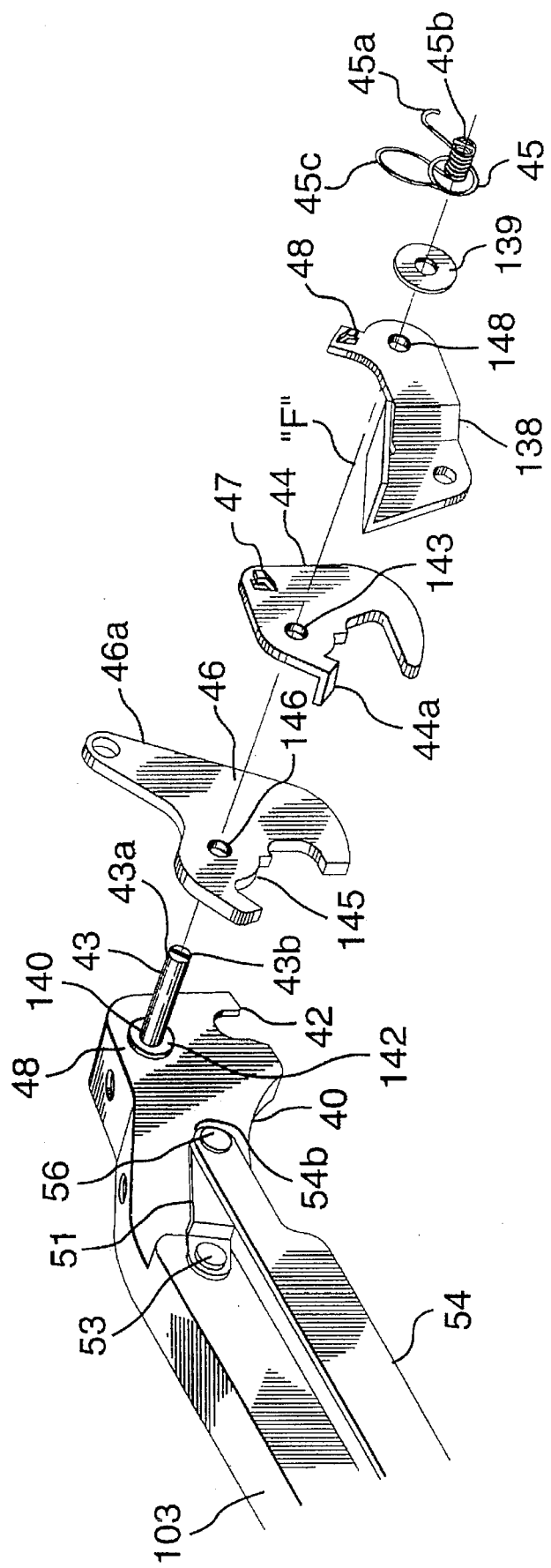
FIG. 7 is an enlarged, exploded perspective view of the encircled area 7 of FIG. 6, with certain minor details omitted for clarity.

As can be best seen in FIG. 7, the pin 43 passes through an aperture 140 in the rear seat leg 40, and is secured in place by a retaining ring 142, and extends outwardly therefrom in a shaft portion 43a. A return biasing means, in the form of a torsion spring 45, is mounted around the pin 43, and is retained in spaced relation from a support bracket 138 by means of a washer 139. The pin 43 passes through aperture 148 of the support bracket 138, which support bracket 138 is bolted or otherwise rigidly affixed in a conventional manner to the rear seat leg 40. The torsion spring 45 is operatively connected at a first end 45a thereof to the first moveable lock member 44 at a raised prong 47, and is operably connected at a second end 45b thereof to an end slot 43b in the shaft portion 43a of the pin 43, and anchored by loop portion 45c to the support bracket 138 at a raised prong 48. In this manner, the torsion spring 45 urges the respective first lock member 44 about the shaft portion 43a into a locked position on the corresponding attachment rod 27.

Figure 3:
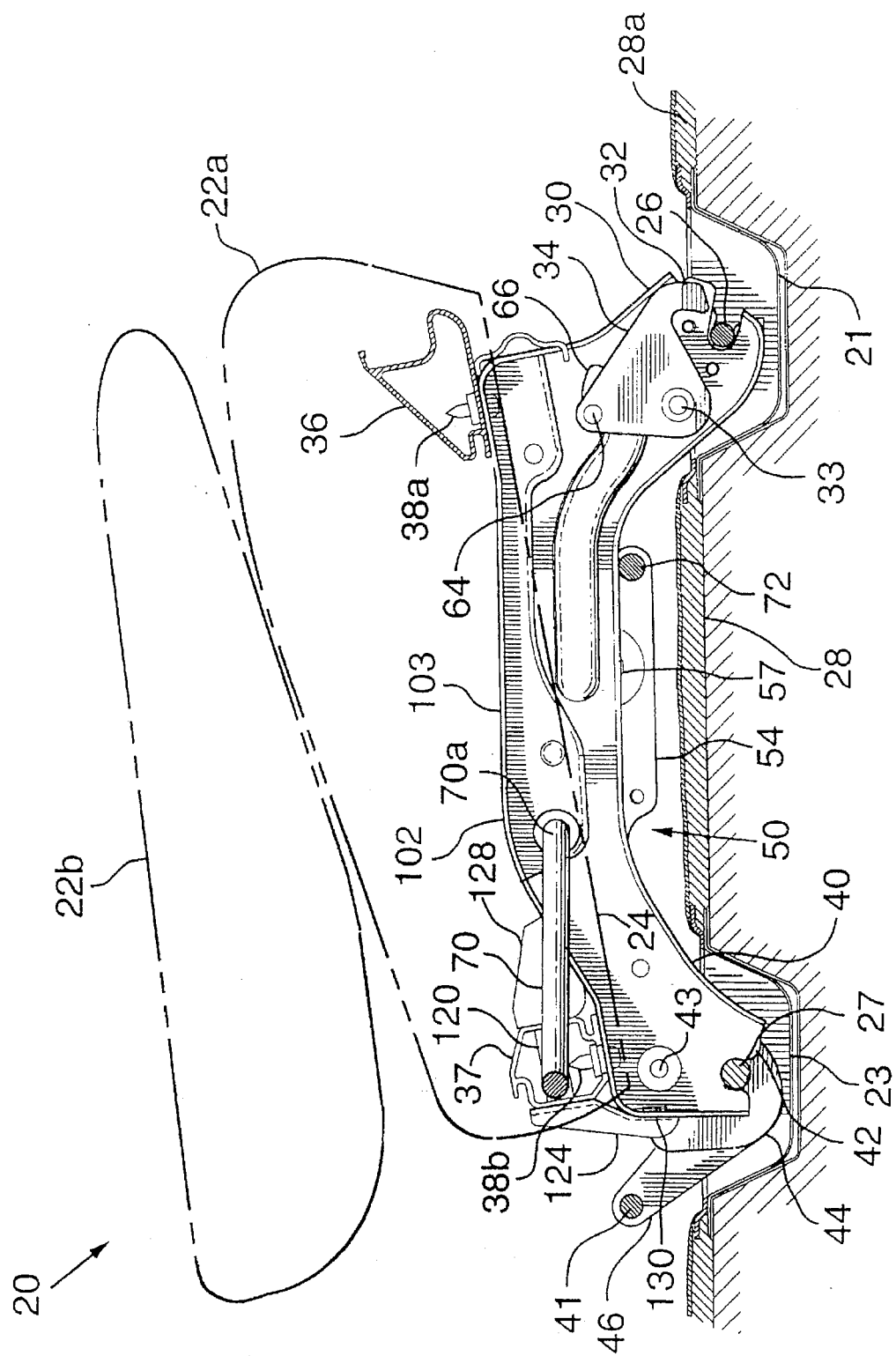
FIG. 3 is a cross-sectional side elevational view of the rear vehicle seat assembly of FIG. 1, taken along site line 3—3 of FIG. 4, with the floor wells sectioned in the plane of site line 11—11 of FIG. 4.
Figure 8:
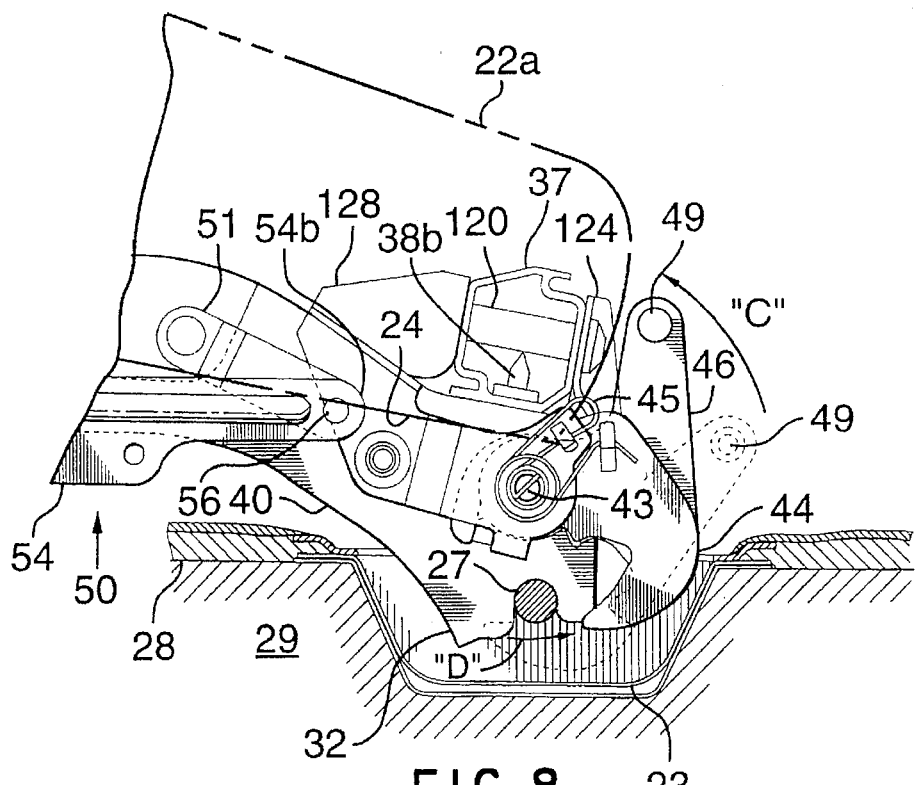
FIG. 8 is an enlarged, side elevational view of the encircled area 7 of FIG. 6, and showing the rear floor well area of the vehicle in cross-section along section line 8—8 of FIG. 5, wherein the first moveable lock member is in an unlocked position.
Figure 9:
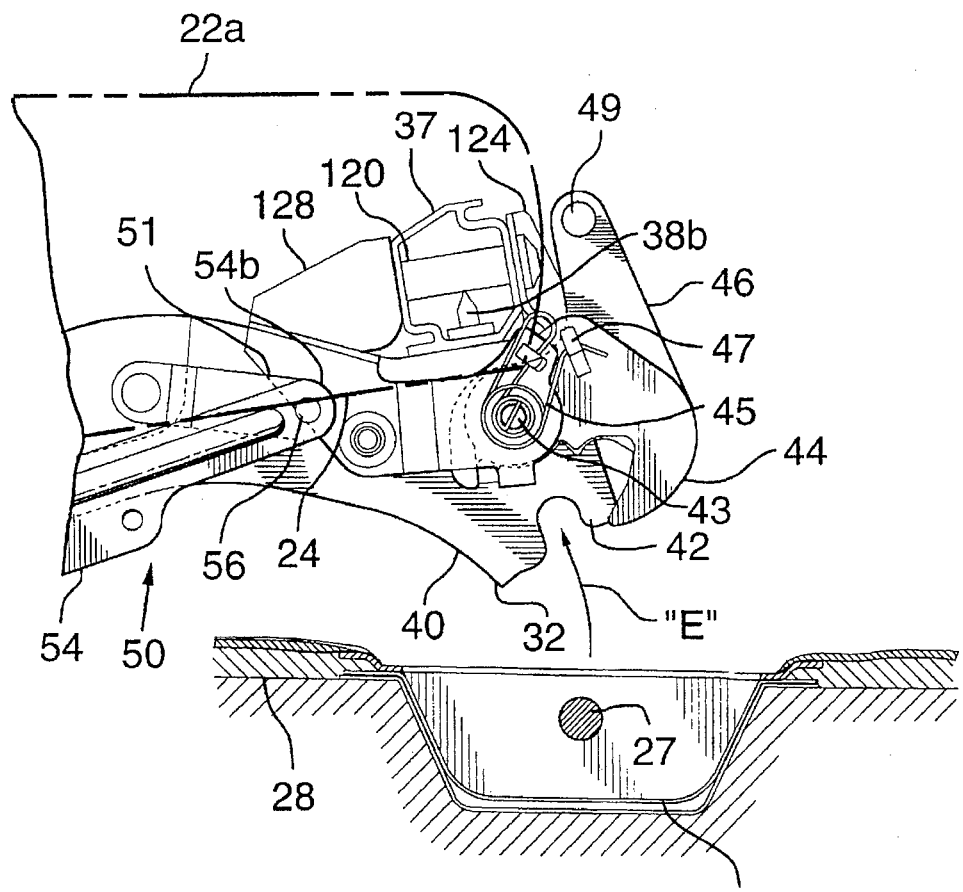
FIG. 9 is a view similar to FIG. 8, wherein the rear seat leg has been lifted from its corresponding attachment rod in the floor of the vehicle.

The first moveable lock member 44 is moveable against the bias of the torsion spring 45 between a locked position, as can best be seen in FIGS. 2 and 3, whereat the first moveable lock member 44 spans across the opening of the forked leg portion 42 of the respective of the rear seat legs 40, so as to thereby lock the respective of the rear seat legs 40 on the corresponding attachment rod 27, and an unlocked position, as best seen in FIG. 8, whereat the first moveable lock member 44 is removed from the vicinity of the opening of the forked leg portion 42 of the respective of the rear seat legs 40, so as to thereby free the rear seat legs 40 from the corresponding attachment rods 27.

A first manually operable member 46 for selectively manipulating the first movable lock member 44 into an unlocked position, is pivotally mounted by means of mounting aperture 146 on the shaft portion 43a of pin 43 adjacent the first movable lock member 44 between the rear seat leg 40 and the support bracket 138 (see FIG. 7). The first manually operable member 46 presents an upwardly directed handle portion 46a. The first manually operable member 46 interacts with the first movable lock member 44 in the following manner to selectively manipulate the first movable lock member 44 into an unlocked position against the action of the torsion spring 45. A detent notch 145 is provided on the first manually operable member 46, which detent notch 145 engages a detent member 44a formed as a bent-over tab on the first movable lock member 44. Thus, the first movable lock member 44 and the first manually operable member 46 move in pivotal concert with one another throughout their respective operative pivotal ranges of motion. Pivotal movement of the first manually operable member 46 in a counter-clockwise direction, as indicated by arrow "C" of FIG. 8, causes the first movable lock member 44 to be carried with the first manually operable member 46 form the locked position shown in phantom outline in FIG. 8, to the unlocked position shown in solid outline in FIG. 8 and in FIG. 9.

The two handle member portions 46a,46a' are connected one to the other by means of a cross-bar 41 secured in place by, for example, threaded fasteners 49,49', so as to thereby effect coincident and equivalent pivotal movement of the two first moveable lock members 44,44', one with the other upon selective movement of the cross-bar 41.

When the first moveable lock member 44 is moved to its unlocked position as aforesaid, the rear seat leg 40 is released with respect to the corresponding attachment rods 27, thereby allowing the entire rear vehicle seat assembly 20 to be pivotally moveable about the front attachment rods 26,26' between the lowered position shown in FIGS. 1-6 and the uptilted position shown in FIG. 10. The vehicle seat assembly 20 can, at this point, be removed from the vehicle, as indicated by arrow "H" of FIG. 13, or can be supported in this position in a manner now to be described.

A first control rod system, as indicated by the general reference numeral 50, is pivotally connected to the support sub-assembly 100, more specifically to the stamped component 102, and is selectively moveable between a stowed position and a deployed support position. In the stowed position, as can best be seen in FIGS. 1-6 and 10, the first control rod system 50 is retracted adjacent the underside 24 of the seat cushion member 22a. It should be noted that the first control rod system 50 is in its stowed position when the rear vehicle seat assembly 20 is in its lowered position, and also initially when the rear vehicle seat assembly 20 has been pivoted in the direction of arrow "G" of FIG. 10 about the fixed attachment rods 26,26' to its uptilted position. In the deployed support position, as best seen in FIG. 14, the first control rod system 50 is stably situated in interposed relation between the underside 24 of the seat cushion member 22a and the vehicle floor 28, when the seat cushion member 22a is in its uptilted position. In the preferred embodiment shown in FIGS. 1-14, there is provided a second control rod system 50' laterally displaced from the first control rod system 50 and associated with the stamped component 102', which second control rod system 50' is analogous and essentially identical to the first control rod system 50 (see FIG. 5). Again, for the sake of simplicity, the second control rod system 50' will not be described in detail; but analogous components thereof appear in the Figures marked with the "'" symbol beside the corresponding reference numerals relating to the respective component described in reference to first control rod system 50.

The first control rod system 50 comprises an elongate support rod 54 operatively mounted to the support sub-assembly 100 for pivotal movement with respect to the support sub-assembly 100, by means of a first connecting arm 51 and a second connecting arm 52. The elongate support rod 54 is pivotally connected to the first connecting arm 51 by means of a staked pin 56 and is pivotally connected to the second connecting arm 52 by means of a staked pin 57.

Figure 13:
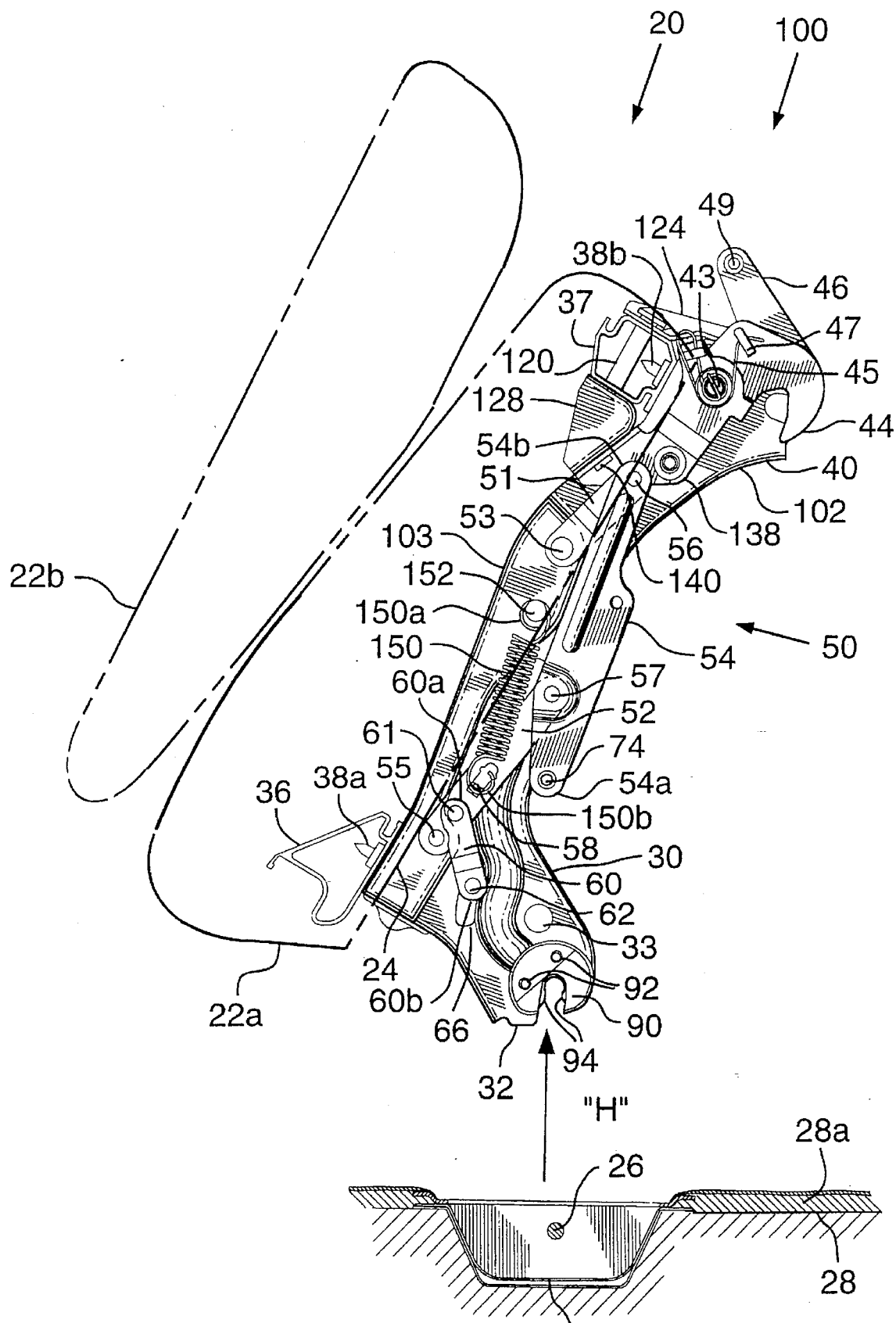
FIG. 13 is a side view similar to FIG. 10, with the rear vehicle seat assembly shown being lifted upwardly from the corresponding attachment rods in the floor of the vehicle, thus removing the rear vehicle seat assembly from the vehicle.
Figure 14:
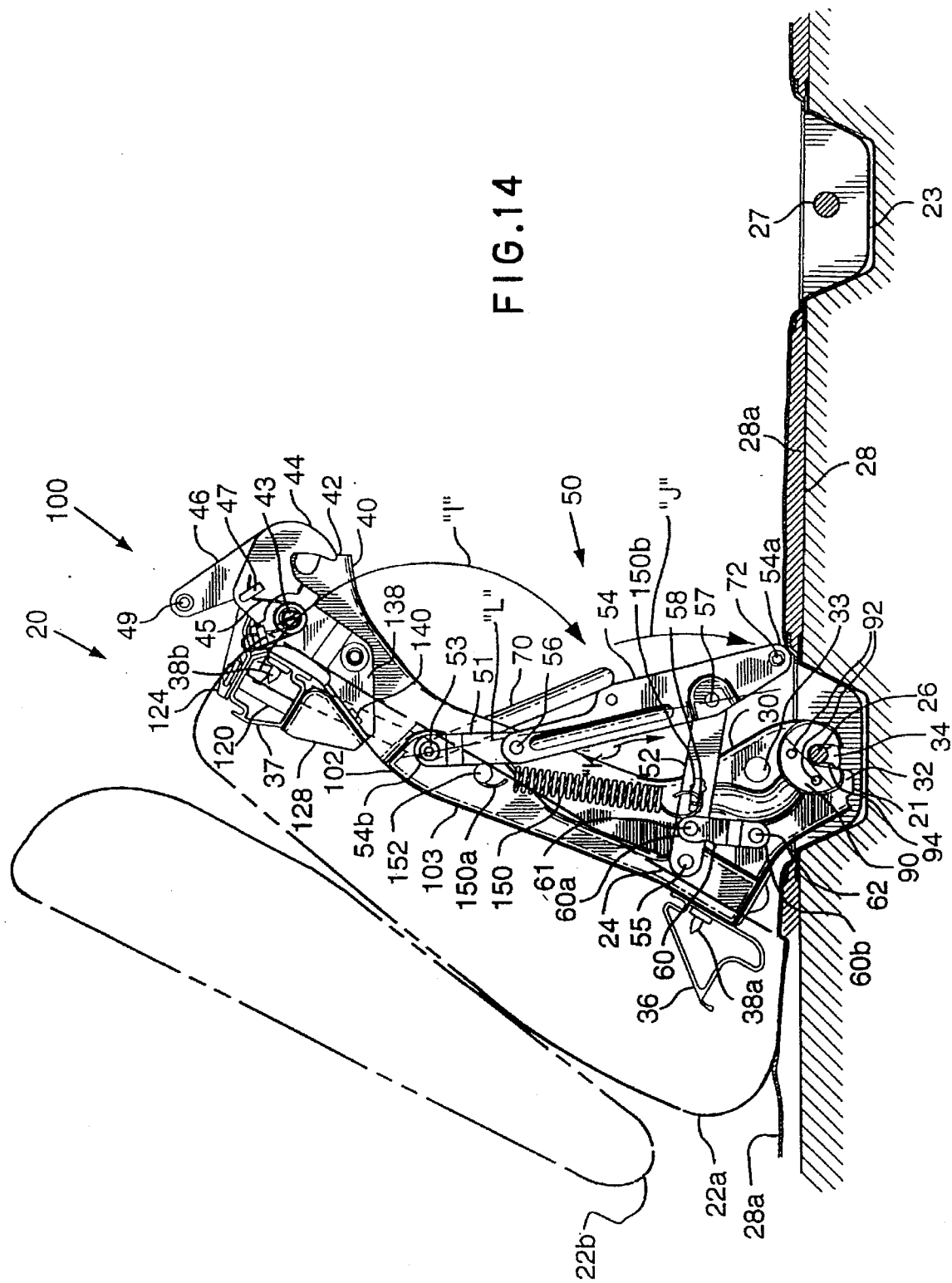
FIG. 14 is a view similar to FIG. 10, showing the first control rod system of the preferred embodiment in a deployed support position.

The first connecting arm 51 is pivotally mounted on the central portion 103 of the stamped component 102 by means of a threaded fastener 53 extending through the stamped component 102 and engaging one end 70a of a curved cross-bar 70 in a manner to permit rotation of the fastener 53 with rotation of the cross-bar 70 (see FIGS. 5 and 13). The opposite other end 70b of the cross-bar 70 similarly engages fastener 53' to effect equivalent co-incident pivotal rotation of the first control rod system 50 and the second control rod system 50'. The curved cross bar 70 is shaped and positioned to be grippable from below the support sub-assembly 100 by a user's hand when the rear vehicle seat assembly 20 is in its uptilted position, so as to thereby permit the first 50 and the second 50' control rod systems to be simultaneously manually moveable between their stowed positions and their deployed support positions upon demand in a single motion.

The second connecting arm 52 is pivotally mounted on the central portion 103 of the stamped component 102 by means of a staked pin 55.

The first control rod system 50 is biased towards its stowed position by means of a spring member 150 operatively interconnected between the stamped component 102 and the elongate support rod 54. One rounded end 150a of the spring member 150 engages a circumferential channel 154 in a pin member 152, which pin member 152 is securely staked to the central portion 103 of the stamped component 102 so as to extend outwardly therefrom. The opposite other rounded end 150b of the spring member 150 engages a tab 58 punched from and extending outwardly from the second connecting arm 52.

In the first control rod system 50, there is also provided a means for manipulating the second moveable lock member 34 in the form of a linking arm 60 which is pivotally connected at a first end 60a thereof to the second connecting arm 52, by a staked pin 61, and pivotally connected at its opposite second end 60b to the second moveable lock member 34 by a guide pin 62 having an extension portion 64, which extension portion 64 passes through a cooperating guide means in the form of a guide slot 66 in the front seat leg 30 (see FIGS. 10 and 11). Thus, the linking arm 60 interconnects the first control rod system 50 with the second moveable lock member 34, for cooperative movement one with the other. In this manner, when the first control rod system 50 is moved to its deployed support position, as shown in FIG. 14, the second moveable lock member 34 is thereby simultaneously moved by the linking arm 60 to its locked position. Further, when the first control rod system 50 is moved to its stowed position, the second moveable lock member 34 is thereby moved by the linking arm 60 to its unlocked position.

The first control rod system 50 and the second control rod system 50' are also operatively interconnected one to the other by means of a straight cross-bar 72 secured at one end 71a by threaded fastener 74 to the elongate support rod 54, as best seen in FIG. 5, and secured at the opposite other end 72a' by threaded fastener (not visible) to the elongate support rod 54'.

In use, in order to release the rear seat legs 40,40' from attachment to the corresponding attachment rods 27,27, a user must first unlock the first moveable lock members 44,44' of each of the rear seat legs 40,40' by manipulation of the cross-bar 41 in the direction of arrow "C" in FIG. 8, which manipulation lifts both of the handle portions 46a, 46a' in the same direction from the phantom position of FIG. 8, to the unlocked position shown in solid lining in FIG. 8. Resultingly, the first moveable lock members 44,44' are pivotally moved through the interaction of the detent notch 145 and detent member 46, as previously described, away from occluding relation with the opening of the forked leg portion 42, as indicated by arrow "D" in FIG. 8, thus moving the two first moveable lock members 44,44' to their unlocked position. Once the first moveable lock members 44,44' have been unlocked in this manner with respect to the attachment rods 27,27, the rear vehicle seat assembly 20 can then be lifted in the direction of arrow "E" of FIG. 9, and can, in this manner, be pivoted forwardly about the fixed attachment rods 26,26 from its lowered position to its uptilted position, as indicated by arrow "G" in FIG. 10. Release of the cross-bar 41 after such lifting by the user causes the cross bar 41, the attached handle portions 46a, 46a', and the lock members 44,44' to return to their original positions under biasing of the torsion spring 45, as shown in FIG. 10.

It can be seen that when the rear vehicle seat assembly 20 has been originally pivotally moved to its uptilted position as aforesaid, the second moveable lock members 34,34' on the front seat legs 30,30' are each in an unlocked position, as is best seen in FIG. 11. Accordingly, the rear vehicle seat assembly 20 can, in this configuration, be readily lifted upwardly off the fixed attachment rods 26,26, in a direction as indicated by arrow "H" of FIG. 13, so as to permit removal of the rear vehicle seat assembly 20 from attachment to the vehicle floor 28.

Alternatively, if it is desired that the rear vehicle seat assembly 20 remain in the vehicle in its uptilted position and in secured relation to the vehicle floor 28, the first 50 and second 50' control rods systems may be simultaneously manipulated to their deployed support position, as will now be described. As shown in FIGS. 12 and 14, the curved cross-bar 70 is manually grasped about its middle section by the user and is pivoted in a generally downward direction, as indicated by arrow "I" in FIGS. 12 and 14, from its starting position between the rear seat legs 40,40' as shown in phantom outline in FIGS. 12 and 14. The first connecting arm 51 is concurrently rotated by this action in the same rotational direction as the cross-bar 70, thus pivoting the elongate support rod 54 about pivot point 56 in the direction of arrow "J" of FIGS. 12 and 14 downwardly toward the vehicle floor 28, against the bias of the spring member 150. The second connecting arm 52 is thereby caused to rotate about its pivotal mounting points 55 and 57, as indicated by arrow "K" of FIGS. 12 and 14.

When the elongate support rod 54 reaches the lower extent of its travel, the bottom ends 54a,54a' of the elongate support rods 54,54' (which ends 54a, 54a' are connected by the straight cross bar 72) intimately engage the carpeting material 28a, and the rear vehicle seat assembly 20 is thereby securely supported in the uptilted position. In actuality, the bottom ends 54a,54a' of the elongate support rods 54,54' engage the carpeting material 28a on the vehicle floor 28, so as to slightly compress the carpeting material 28a. Such compression of the carpeting material 28a imparts an upwardly directed bias to the elongate support rods 54,54', thus precluding rattling movement of the first control rod system 50. In this manner, the vehicle seat assembly 20 is supported by the first control rod system 50 in its uptilted position.

Slight further movement of the cross-bar 70 in the direction of arrow "I", causes the top ends 54b,54b' of the elongate support rods 54,54' to move past the centre line "L" extending between the threaded fastener 53 and the staked pin 57 (see FIG. 14), in an "over centre" action, to its final rest position. The first control rod system 50 is thereby moved in the above-described manner from its stowed position adjacent the underside 24 of the seat cushion member 22a to its deployed support position between the underside 24 of the seat cushion member 22a and the vehicle floor 28, as shown in FIGS. 12 and 14. The spring member 150 biases the first control rod system 50 into this deployed support position.

As the first control rod system 50 is moved from its stowed position to its deployed support position, the second connecting arm 52 moves the linking arm 60 in the manner described above. Accordingly, the extension portion 64 of the guide pin 62 moves through the guide slot 66 causing the second moveable lock member 34 to pivot about the staked pin 33 to its locked position around the fixed attachment rod 26, as indicated by arrow "M" in FIG. 12. A similar action simultaneously occurs in respect of the second moveable lock member 34' associated with the front seat leg 30'. Thus, the rear vehicle seat assembly 20 is locked in place in the vehicle.

To return the rear vehicle seat assembly 20 from its supported uptilted position to its lowered position, or to remove the rear vehicle seat assembly 20 from the vehicle, the first control rod system 50 is moved from its deployed support position to its stowed position by manual manipulation of the cross-bar 70 in a direction opposite to the direction indicated by arrow "I". Such manipulation causes the second movable lock member 34 to unlock from the fixed attachment rod 26 by movement in a direction opposite to that of arrow "M", and for the components of the first control rod system 50 described above to move in their respective reverse directions, such that the rear vehicle seat assembly 20 passes through the configuration shown in FIG. 13, (at which position it may be removed from the vehicle) and thence, on continued pivotal movement about the fixed attachment rods 26,26, back to the general configuration of FIGS. 9 and 10, whereat the first moveable lock members 44,44' are in their unlocked configurations, thereby to allow insertion of the fixed attachment rods 27,27, within the forked leg portions 42,42' of the rear seat legs 40,40'. The cross-bar 41 is then released by the user, whereupon the torsion springs 45,45' act upon each of the first manually operable members 46,46' and the first moveable lock members 44,44' in the manner previously described to securely lock the rear seat legs in place with respect to the fixed attachment rods 27,27, as shown in FIGS. 2 and 3.

Figure 15:
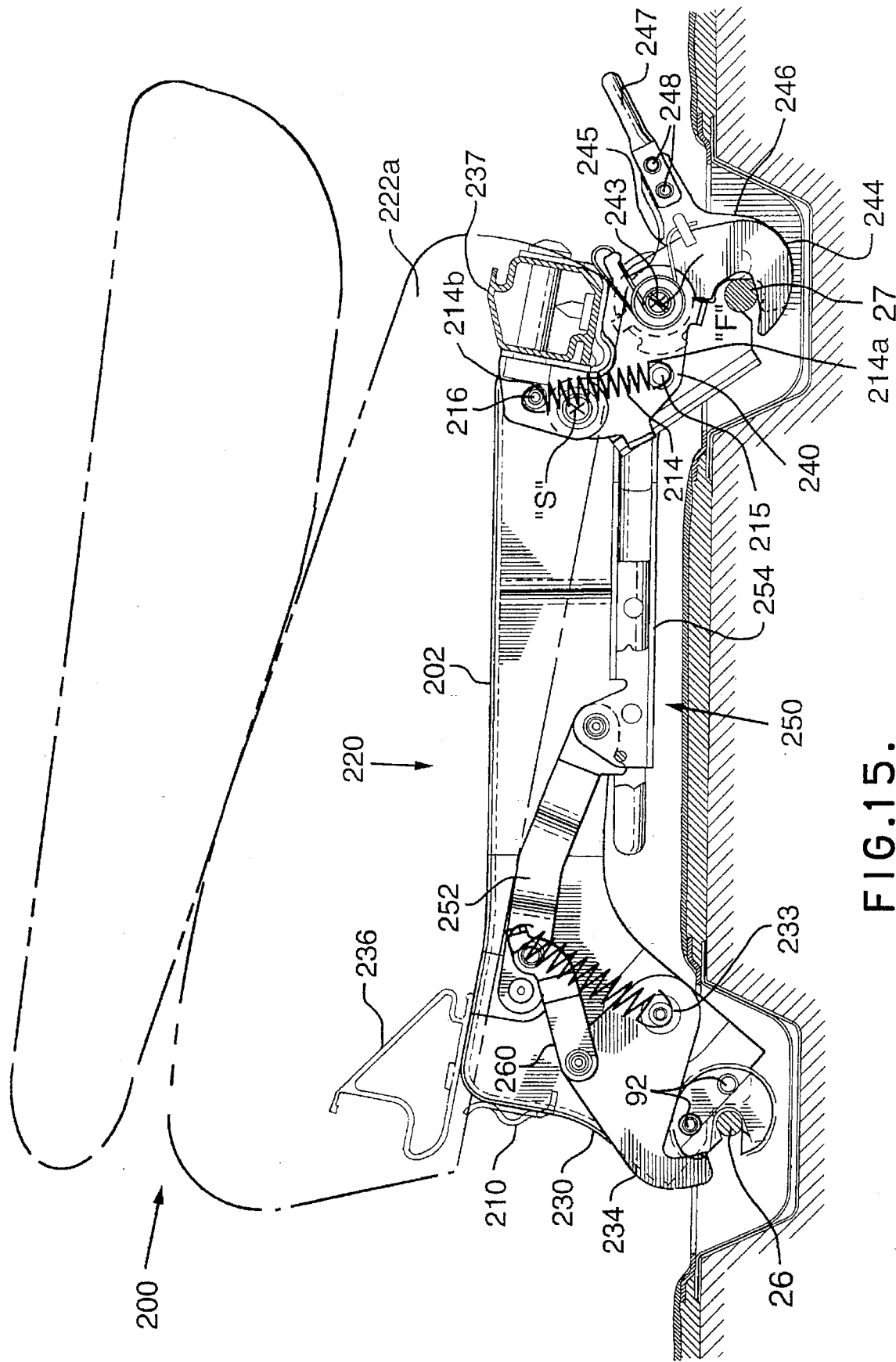
FIG. 15 is a cross-sectional, side elevational view of an alternative embodiment of the rear vehicle seat assembly according to the present invention, shown in a lowered in-use position.
Figure 16:
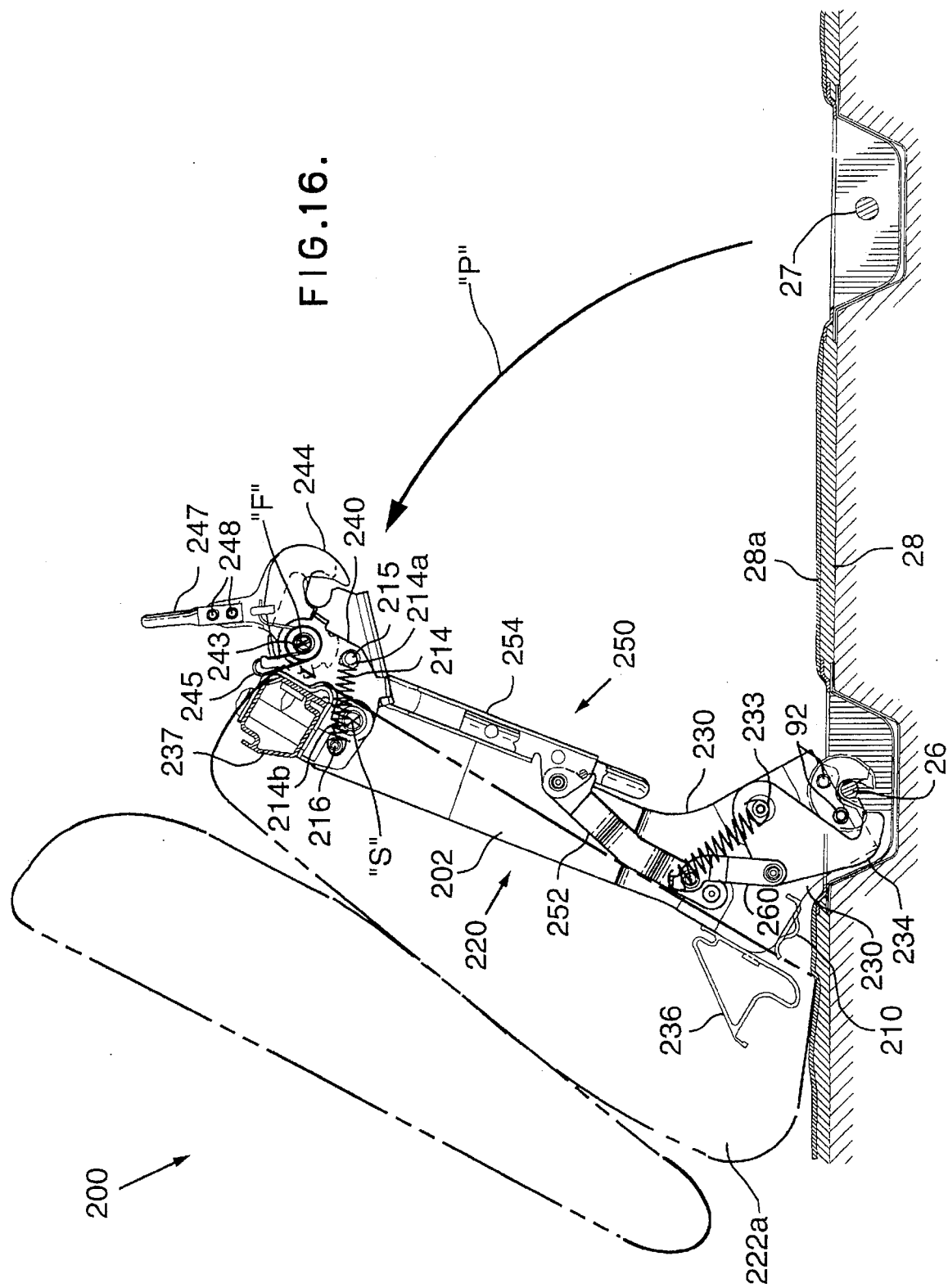
FIG. 16 is a cross-sectional, side elevational view of the alternative embodiment of FIG. 15, shown in an uptilted position, with the first and second control rod systems in a stowed position; and, FIG. 17 is a cross-sectional side elevational view of the alternative embodiment of FIGS. 15 and 16, shown in an uptilted position, with the first and second control rod systems in their deployed support positions.
Figure 17:
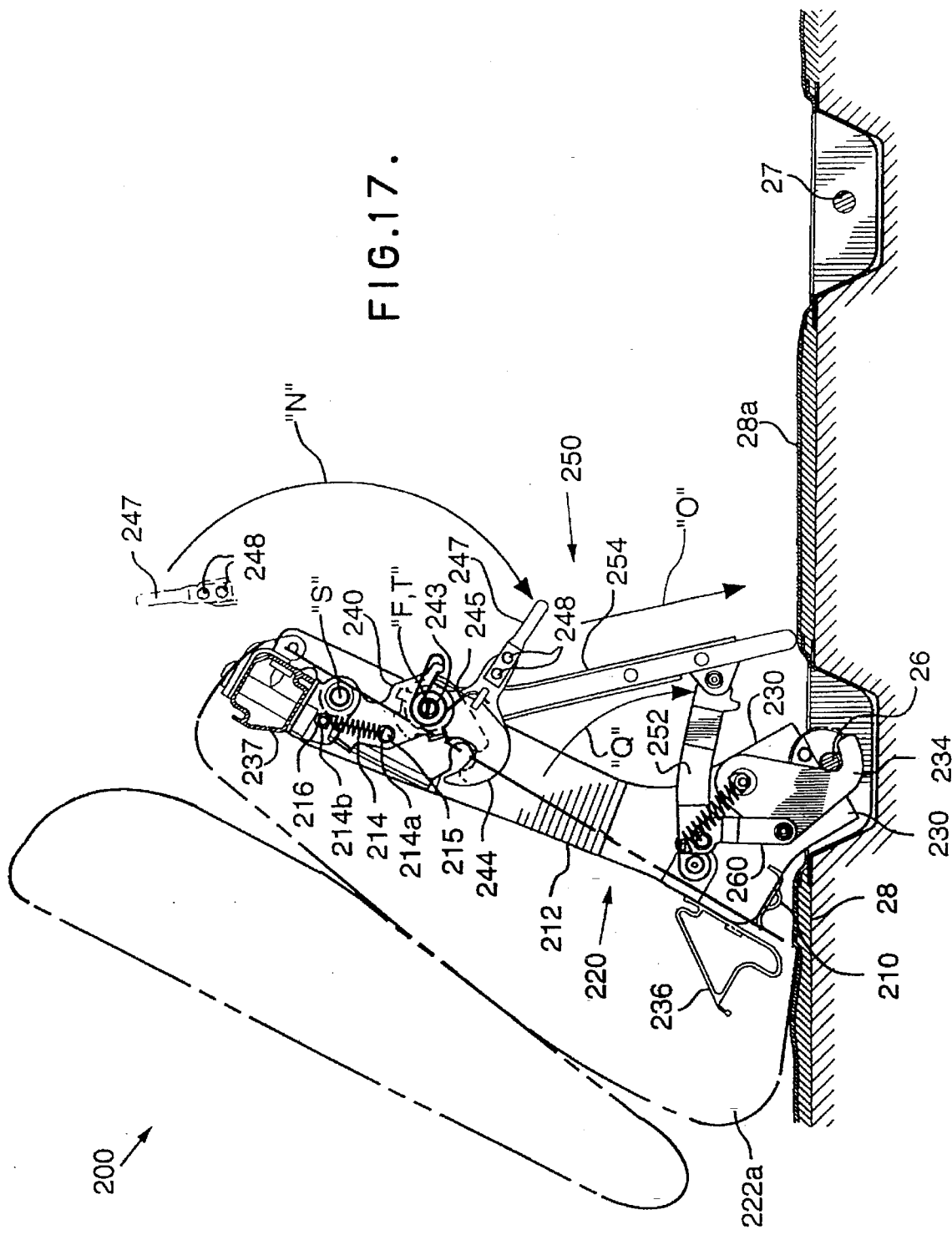

Other embodiments of the present invention also fall within the scope and spirit of the claims presented herewith. One such alternative embodiment is shown in FIGS. 15 through 17. This embodiment is similar in structure and function to the preferred embodiment already described, except for relatively minor differences in the structure of parts of the first and second control rod systems and the rear seat legs. This specific alternative embodiment will now be described, focusing only on the actual differences between the alternative embodiment and the preferred embodiment already described, and not on the features and parts that are common to both. Such similarities will be readily apparent to those skilled in the art. Reference will be made to one pair of seat legs only, where possible, in an analogous manner to the preceding description of the preferred embodiment.

In FIGS. 15 through 17, the alternative embodiment rear vehicle seat assembly is designated by the general reference numeral 200. The front seat leg 230 extends laterally rearwardly at its upper extent to form a central support portion 202. The rear seat leg 240 is pivotally mounted on the central support portion 202 by means of a staked pin 211 for pivotal movement about a second pivot axis "S" aligned with the axis of the pin 211 between an extended position, as is best shown in FIGS. 15 and 16, and a retracted position, as is best shown in FIG. 17. The rear seat leg 240 is biased towards its extended position (shown in FIGS. 15 and 16) when the rear seat leg is to the right of the axis "S" by means of a spring member 214 operatively connected at its one end 214a to the rear seat leg 240 at pin 215 and at its opposite other end 214b to the central support portion 202 at pin 216, and is biased towards its retracted position when the rear seat leg 240 is pivoted to the left of axis "S", as is described more fully below. As in the preferred embodiment, the first movable lock member 244 is pivotally mounted on the rear seat leg 240 by means of a staked pin 243, for pivotal movement about a first pivot axis "F", which axis is aligned with the axis of the staked pin 243. A handle portion 246 of the first moveable lock member 243 has an extension portion 247 secured to itself by means of rivets 248, so as to permit selective operation of the first movable lock member 244. The extension portion 242 laterally extends to connect to the extension portion (not shown) associated with the other pair of seat legs.

A second moveable lock member 234 is pivotally mounted on the front seat leg 230 by means of a staked pin 233, for similar movement and operation as the second moveable lock member 234 in the preferred embodiment previously described.

A first control rod system, as indicated by the general reference numeral 250, is operatively mounted to the central support portion 202 in a manner similar to that described in the preferred embodiment for the first control rod system 50. The front seat leg 230, the central support portion 202 and the rear seat leg 240 are joined in an analogous manner to their counterparts (not shown) on the opposite lateral side of the rear seat assembly 200 by means of a front frame rail 236, cross-beam 200, and a rear frame rail 237 to form a support sub-assembly 220 for supporting the seat cushion member 222a. The first control rod system 250 comprises an elongate support rod 254 operatively mounted on the central support portion 202 by means of a second connecting arm 252, in the same general manner as in the preferred embodiment, and further pivotally connected by means of the staked pin 243 to the rear seat leg 240 for pivotal movement about a third pivot axis "T", which third pivot axis "T" is separate and distinct from the second pivot axis "S". The third pivot axis "T" may, however, be made to be co-axial with the first pivot axis "F", as is the case with the alternative embodiment illustrated in FIGS. 15–17, for ease of manufacture.

In use, the rear vehicle seat assembly 200 is moved from its lowered locked in-place position, as seen in FIG. 15, by first lifting the extension portion 247 of the handle member 246 against the biasing of torsion spring 245, thus releasing the first movable lock member 244 from locking engagement with the fixed attachment rod 27. The rear vehicle seat assembly 200 is then pivoted upwardly and forwardly, as indicated by arrow "P" in FIG. 16, until the rear vehicle seat assembly 200 reaches its uptilted position. The extension portion 247 of the handle portion 246 is then manipulated downwardly from its starting position as shown in phantom outline in FIG. 17, such that the rear seat leg 240 pivots from its extended position about axis "S" to its retracted position, as indicated by arrow "N" in FIG. 17. The over-center action of spring member 214 biases the rear seat leg 240 to its retracted position once it is moved past axis "S". This pivotal movement of the rear seat leg 240 between its extended position and its retracted position, causes corresponding movement of the first control rod system 250 between its stowed position and its deployed support position, as indicated by arrow "O" in FIG. 17.

In a manner analogous to the preferred embodiment, the second moveable lock member 234 is moved from an unlocked position, as is best seen in FIGS. 15 and 16, to a locked position, as is best seen in FIG. 16, by movement of the first control rod system 250 between its stowed position and its deployed support position, which movement causes corresponding movement of the second connecting arm 252 in a direction as indicated by arrow "O" in FIG. 17. The connecting arm 252 causes the linking arm 260 to pivot the second moveable lock member 234 to its locked position. It should be noted that the linking arm 260 and the second moveable lock member 234 are on the same side of the front seat leg 230 as each other, thus precluding the need for a guide slot in the front seat leg 230 and a guide pin having an extension portion passing therethrough, as is required in the preferred embodiment previously described.

It is to be understood that while certain forms of the present invention have been illustrated and described herein, it is not to be limited to the specific forms or arrangement of parts described and shown, but is only limited by the claims appended hereto.

We claim:

1. A rear vehicle seat assembly comprising:

a seat cushion member having an underside;

a support sub-assembly supporting said seat cushion member and comprising two or more downwardly extending front seat legs and two or more downwardly extending rear seat legs, each of said front seat legs including a forked leg member co-operable with a fixed attachment rod supported by a vehicle floor and each of said rear seat legs including a forked leg portion co-operable with a fixed attachment rod supported by said vehicle floor;

a first moveable lock member mounted on each of said rear seat legs for selectively locking the respective one of said rear seat legs on the corresponding attachment rod;

a return biasing means operatively connected to each first lock member for respectively urging each said first lock member into a locked position on the corresponding attachment rod;

a first manually operable means mounted on each of said rear seat legs to provide for selective manipulation of each first moveable lock member to an unlocked position against said return biasing means so as to release said rear seat legs with respect to the corresponding attachment rod, thereby to allow the vehicle seat assembly to be pivotally moveable about the corresponding attachment rod associated with each of the front seat legs between a lowered position and an uptilted position;

a first control rod system pivotally connected to said support sub-assembly and selectively moveable between a stowed position whereat said first control rod system is retracted adjacent the underside of said seat cushion member, and a deployed support position whereat said first control rod system is situated in stable, interposed relation between the underside of said seat cushion member and said vehicle floor, when said vehicle seat assembly is in said uptilted position, so as to support said vehicle seat assembly in said uptilted position.

2. The rear vehicle seat assembly of claim 1, further comprising a second moveable lock member mounted on each of said front seat legs for selectively locking the respective one of said front seat legs on the corresponding attachment rod, and a means for selectively manipulating each second moveable lock member.

3. The rear vehicle seat assembly of claim 2, further comprising a return biasing means operatively mounted on each of said front seat legs for urging each said second lock member into a locked position on the corresponding attachment rod.

4. The rear vehicle seat assembly of claim 3, further comprising a linking arm operatively connected to said first control rod system and said second moveable lock member, so as to interconnect said first control rod system and said second moveable lock member for co-operative movement one with the other, whereby, when said first control rod system is moved to its deployed support position, said second moveable lock member is thereby moved by said linking arm to its locked position, and when said first control rod system is moved to its stowed position, said second moveable lock member is thereby moved by said linking arm to its unlocked position.

5. The rear vehicle seat assembly of claim 4, wherein said linking arm is pivotally connected to said first control rod system.

6. The rear vehicle seat assembly of claim 5, wherein said first control rod system comprises an elongate support rod operatively mounted to said support sub-assembly for pivotal movement with respect to said support sub-assembly.

7. The rear vehicle seat assembly of claim 6, wherein said control rod system further comprises a first connecting arm pivotally connected to said elongate support rod and pivotally connected to said support sub-assembly, with said elongate support rod thereby being operatively mounted to said support sub-assembly by means of said first connecting arm.

8. The rear vehicle seat assembly of claim 7, wherein said linking arm is pivotally connected to said first connecting arm.

9. The rear vehicle seat assembly of claim 8, wherein said linking arm is pivotally connected to said second moveable lock member.

10. The rear vehicle seat assembly of claim 9, wherein said linking arm and said second moveable lock member are pivotally connected by a pin member having an extension portion, which extension portion operatively engages a co-operating guide means in said support sub-assembly so as to limit the travel of said second moveable lock member.

11. The rear vehicle seat assembly of claim 10, wherein said co-operating guide means comprises at least one guide slot in said support sub-assembly, and said extension portion passes through said guide slot.

12. The rear vehicle seat assembly of claim 11, wherein said at least one guide slot comprises a guide slot disposed one in each of said front seat legs.

13. The rear vehicle seat assembly of claim 12, wherein said control rod system further comprises a second connecting arm pivotally connected to said elongate support rod and pivotally connected to said support sub-assembly, with said elongate support rod being operatively mounted to said support sub-assembly by means of said second connecting arm.

14. The rear vehicle seat assembly of claim 13, wherein said front seat legs comprise two generally parallel legs.

15. The rear vehicle seat assembly of claim 14, further comprising a second control rod system laterally displaced from said first control rod system, and pivotally connected to said support sub-assembly and selectively moveable between a stowed position whereat said second control rod system is retracted adjacent the underside of said seat cushion member, and a deployed support position whereat said second control rod system is stably situated in interposed relation between the underside of said seat cushion member and said vehicle floor when said support sub-assembly is in said uptilted position, so as to support said support sub-assembly in said uptilted position.

16. The rear vehicle seat assembly of claim 15, wherein said second control rod system comprises an elongate support rod and a first connecting arm pivotally connected to said elongate support rod and pivotally connected to said support sub-assembly, with said elongate support rod being operatively mounted to said support sub-assembly by means of said first connecting arm, and also by means of a second connecting arm pivotally connected to said elongate support rod and pivotally connected to said support sub-assembly.

17. The rear vehicle seat assembly of claim 16, further comprising a cross bar secured to each of said first and second control rod systems to effect equivalent simultaneous pivotal movement of each of said first and second control rod systems one with the other.

18. The rear vehicle seat assembly of claim 17, wherein said cross bar is secured to the elongate support rods of said first and second control rod systems to effect said equivalent simultaneous pivotal movement of each of said elongate support rods one with the other.

19. The rear vehicle seat assembly of claim 18, wherein each second moveable lock member is pivotally mounted on the respective front seat leg.

20. The rear vehicle seat assembly of claim 19, wherein said first control rod system is manually moveable between its stowed position and its deployed support position.

21. The rear vehicle seat assembly of claim 20, wherein said rear seat legs comprise two generally parallel legs.

22. The rear vehicle seat assembly of claim 21, wherein each said first moveable lock members is pivotally mounted on the respective rear seat leg for pivotal movement about a first pivot axis.

23. The rear vehicle seat assembly of claim 12, wherein said rear seat leg is pivotally mounted on said support sub-assembly for pivotal movement about a second pivot axis.

24. The rear vehicle seat assembly of claim 23, wherein said first control rod system is pivotally mounted on said rear seat leg for pivotal movement about a third pivot axis, which third pivot axis is separate and distinct from said second pivot axis, such that pivotal movement of said rear seat leg about said second pivot axis causes simultaneous movement of said first control rod system between its stowed position and its deployed support position.

25. The rear vehicle seat assembly of claim 24, wherein said first pivot axis and said third pivot axis are co-axial.

* * * * *